T. A. SERAPHIN.
FIELD STANDARD FOR TESTING LIQUID MEASURING DEVICES.
APPLICATION FILED FEB. 13, 1918.
1,277,760.
Patented Sept. 3, 1918.
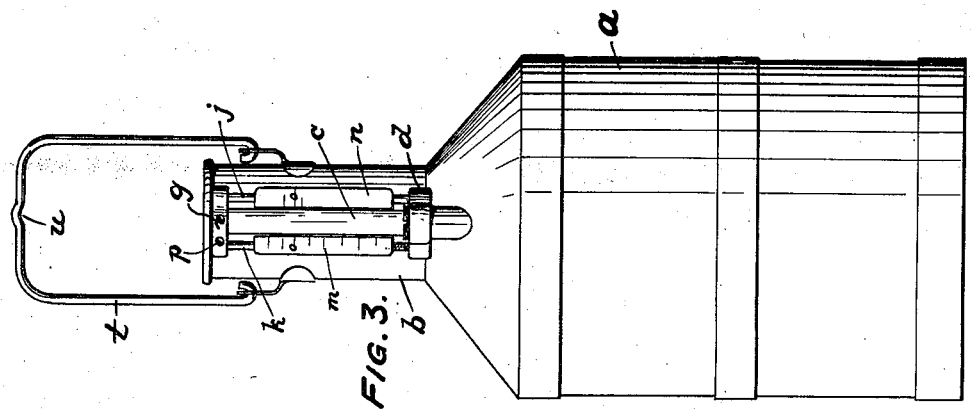
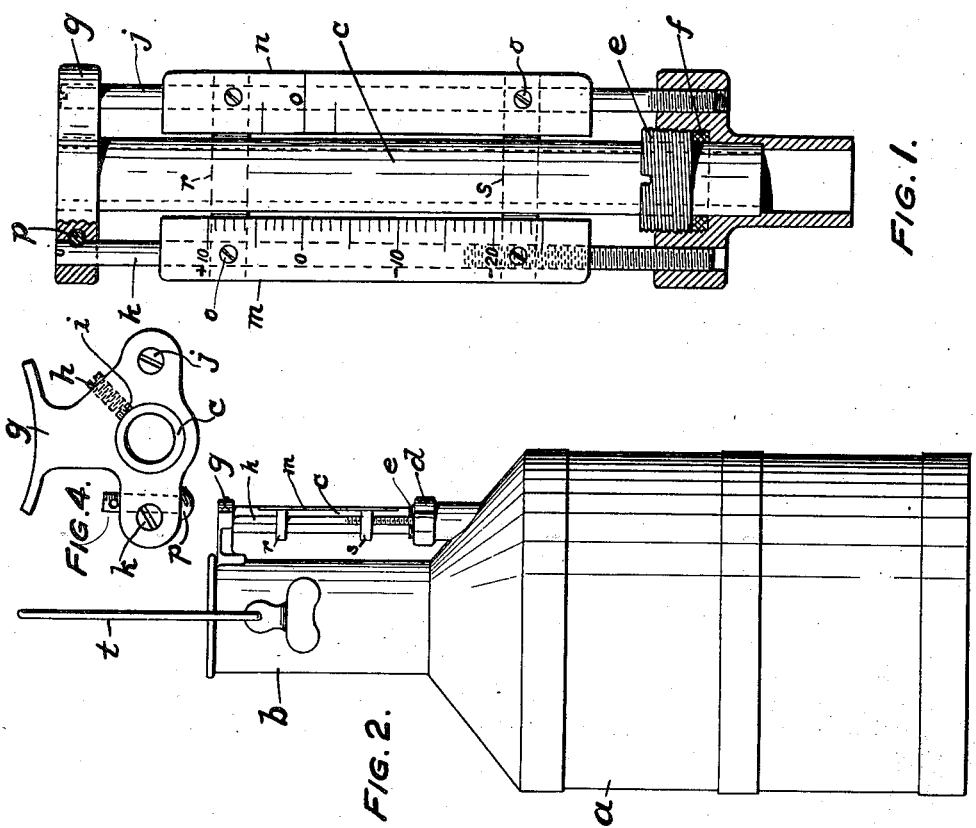
WITNESS:
INVENTOR
Theophilus A. Seraphin
BY
Frank J. Busser
ATTORNEY.

UNITED STATES PATENT OFFICE.

THEOPHILUS A. SERAPHIN, OF PHILADELPHIA, PENNSYLVANIA.

FIELD-STANDARD FOR TESTING LIQUID-MEASURING DEVICES.

1,277,760. Specification of Letters Patent. Patented Sept. 3, 1918.

Application filed February 13, 1918. Serial No. 216,932.

*To all whom it may concern:*

Be it known that I, THEOPHILUS A. SERAPHIN, a citizen of the United States, residing at Philadelphia, county of Philadelphia, and State of Pennsylvania, have invented a new and useful Improvement in Field-Standards for Testing Liquid-Measuring Devices, of which the following is a full, clear, and exact description, reference being had to the accompanying drawings, which form a part of this specification.

My invention comprises a device by the use of which a practical test may be made, on the highway or elsewhere, of the measuring qualities of automatic liquid measuring devices, liquid measures, containers, etc. The invention eliminates the use of a glass graduate or other separate reading measure; eliminates the use of a glass slicker plate; and eliminates spilling, which is hazardous when using gasolene. The construction of the device is such that it is possible to set or adjust it without making any mechanical or physical changes, and to seal it after it has been set or adjusted in such a manner that the seal will have to be broken before it can be tampered with or changed. The use of my improvement saves considerable time in making a test, as compared with old testing standards. The device can be handled with greater ease and comfort and with very little danger of being damaged. Only one person is required to make a test, whereas the device heretofore commonly used requires two persons.

A preferred embodiment of the invention is shown in the accompanying drawings, in which—

Figure 1 is a front view of the standard partly in section.

Fig. 2 is a side view of the standard, showing reading and adjustment attachment applied to the container.

Fig. 3 is a front view of the same.

Fig. 4 is a top plan view of the parts shown in Fig. 1.

This standard consists of a container $a$ as shown in Figs. 2 and 3, and made so as to contain a certain amount above its so-called size. This container has a long neck, having a reasonably small diameter so that any reasonably small amount of liquid will make a reasonably definite change in the height of the liquid column in the neck of the container. The front of the neck of this standard is equipped with a vertical transparent glass gage $c$, the lower end of which is secured or fastened in a gage bracket $d$ into which it opens. Gage bracket $d$ in turn is secured or fastened into the container into which it opens. Leakage between this vertical transparent glass gage and gage bracket $d$ is prevented by this glass gage going through a packing which is compressed sufficiently by the turning of screw sleeve $e$. The upper end of this glass gage is held in place by a guide bracket $g$ which is fastened to side of neck of container or standard. Guide bracket $g$ has a clear hole through which the glass gage may be slid into place or taken out. This clear hole also permits the upper end of glass gage to open to the atmosphere, which improves the flow of the liquid from the neck of the container or standard when being emptied. The entrance of air into the body of container or standard through this glass gage takes up the space made vacant by the liquid as it is being poured out, thereby preventing the usual gurgling caused by the inrush of air through the same opening that the liquid is being poured through. A small set screw $h$ is made to go through a tap hole in guide bracket $g$ and press against a small leather or rubber disk $i$ sufficiently to keep the glass gage in a firm and rigid position. On one side of the glass gage and parallel thereto is a guide rod $j$, the upper end is held in place by extending through a clear hole in guide bracket $g$, and the lower end is threaded and screwed into a tapped hole in gage bracket $d$. On the other side of the glass gage and parallel thereto is the adjusting guide rod $k$; the upper end of which is held in place by extending through a clear hole in the guide bracket $g$, and the lower end, which is threaded, extends through a clear hole in the gage bracket $d$. These two rods $j$ and $k$ hold in place the graduated scale $m$ and the tolerance scale $n$ which are yoked together near the top by the gage yoke $r$ and having two clear holes which the rods $j$ and $k$ pass through. These two scales $m$ and $n$ are yoked together near the bottom by the adjusting gage yoke $s$ which has one clear hole and one tapped hole. Through the clear hole passes the guide rod $j$ and through the tapped hole the adjusting guide rod $k$, having a long thread on one end, screws through. The two scales $m$ and $n$ and the two yokes $r$ and $s$ are held or fastened together by the small machine screws o. This arrangement or assembly of parts j, k, r, s, m and n affords a guard for the glass gage. The graduated scale m is graduated into any suitable subdivision of a liquid unit of measure, and reading plus above a certain graduation or mark called zero or capacity, and reading minus below this zero or capacity graduation or mark. The tolerance scale n may have the zero or capacity graduation or mark, and in addition, two marks, one above and the other below the zero or capacity mark, to indicate the limits of permissible variation in the liquid measuring devices to be tested, or may be marked for any special designation.

The handle t of this standard is made with a notch in its center so that when it is advisable to suspend it in making a test or taking readings, it will naturally suspend in a vertical position. In using this standard for testing an automatic liquid measuring device, for example: a gasolene measuring pump will be here considered, the standard is hung under the nozzle of pump by the handle which has a notch in its center so as to insure its perpendicular suspension, and if, for example, the standard is a five gallon one, then the pump is operated for the purpose of pumping five gallons of liquid into the standard, and if the amount discharged into the standard is correct, the height of the liquid column in the glass gage c should be opposite the zero or capacity graduation; if not, then the minus or plus discrepancy can be easily seen by observing the graduation on the graduated scale m opposite the height of the liquid column. When standard cannot be suspended, as in a case where pump or any other device has only a hose discharge, or in any way does not permit of its proper suspension, then standard can be used by resting on a level surface.

This standard may also be used in testing liquid measures or containers by filling it to the zero or capacity mark or graduation, and then pouring contents into the measure or container to be tested, or vice versa; that is, the measure or container to be tested can be filled first and contents then poured into the standard, and observation made of the mark or graduation opposite the height of the liquid column in glass gage.

The adjusting feature of my invention is as follows: By turning the adjusting guide rod k, which is slotted on its top for a screw driver, and which screws into the adjusting gage yoke s the scales m and n as they are yoked together by the yokes r and s are moved up or down on the rods k and j so that the zero or capacity mark or graduation may be set at the proper height, and after this adjustment is made, it is then locked or fastened by the pin or rivet p extending through a hole in the guide bracket g. The center of this hole is located so as to cut away part of the upper side of the rod k. This pin or rivet p having a small hole in its end makes possible the sealing of the adjusting device of the standard by running through this hole a regular wire and lead seal.

Having now fully described my invention, what I claim and desire to protect by Letters Patent is:

1. A field standard comprising a container provided with a neck, an upright glass gage in front of the neck and communicating with the interior of the container, and two upright scales arranged on opposite sides of, and close to, the glass gage, thereby protecting the glass gage from injury and affording means for determining the measuring efficiency or accuracy of a liquid measuring device and for measuring the contents of liquid measures and containers.

2. A field standard comprising a container provided with a neck, an upright glass gage in front of the neck, and a graduated scale and a tolerance scale arranged relatively close to the glass gage, the first scale having a multiplicity of graduations for measuring the contents of the vessel and the second scale having two marks at different levels indicating the limits of permissible error in the liquid measuring device to be tested.

3. A field standard comprising a container, a glass gage communicating with the interior thereof, a scale extending along the glass gage, and means to adjust the scale vertically relatively to the glass gage.

4. A field standard comprising a container, a glass gage communicating with the interior thereof, a scale extending along the glass gage, means to adjust the scale vertically relatively to the glass gage, and means to lock the scale in its adjusted position.

5. A field standard comprising a container provided with a neck, an upright glass gage in front of the neck and communicating with the interior of the container, a gage bracket supporting the glass gage and supported by the container, a guide bracket secured to the neck of the container, an upright rod supported at its lower end in the gage bracket and guided at its upper end in a hole in the guide bracket, and a scale connected with said rod.

6. A field standard comprising a container, a glass gage communicating with the interior thereof, yokes between said rods, a scale carried by said yokes, one of said rods being threaded in one of said yokes, whereby the scale may be adjusted relatively to the last named rod by turning the latter, and means to maintain the last named rod in a definite position relative to the container.

7. A field standard comprising a container provided with a neck, an upright glass gage in front of the neck and communicating with the interior of the container, a gage bracket supporting the glass gage and supported by the container, a guide bracket secured to the neck of the container, two upright rods one of which is supported in the gage bracket and guided in the guide bracket and the other of which is guided in both brackets, yokes between said rods, one of said yokes being threaded on the last named rod, and a scale carried by said yokes.

8. A field standard comprising a container provided with a neck, an upright glass gage in front of the neck and communicating with the interior of the container, a gage bracket supporting the glass gage and supported by the container, a guide bracket secured to the neck of the container, two upright rods one of which is supported in the gage bracket and guided in the guide bracket and the other of which is guided in both brackets, yokes between said rods, one of said yokes being threaded on the last named rod, a scale carried by said yokes, and a locking pin engaging cut away parts in the last named rod and the guide bracket.

In testimony of which invention, I have hereunto set my hand, at Philadelphia, on this 9th day of February, 1918.

THEOPHILUS A. SERAPHIN.

Witnesses:
 CLINTON A. SOWERS,
 VITOLD E. BALUKIEWICZ.